United States Patent
Mazzocco et al.

(10) Patent No.: US 11,292,319 B2
(45) Date of Patent: Apr. 5, 2022

(54) OPERATION OF A HVAC SYSTEM TO DESORB A FILTER

(71) Applicant: GM Global Technology Operations LLC, Detroit, MI (US)

(72) Inventors: Nicholas Mazzocco, Clawson, MI (US); Derek Giordano, Lyon Township, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 443 days.

(21) Appl. No.: 16/367,982

(22) Filed: Mar. 28, 2019

(65) Prior Publication Data

US 2020/0307360 A1 Oct. 1, 2020

(51) Int. Cl.
*B01D 53/04* (2006.01)
*B60H 3/06* (2006.01)

(52) U.S. Cl.
CPC ....... *B60H 3/0633* (2013.01); *B01D 53/0446* (2013.01); *B01D 2257/90* (2013.01); *B01D 2259/4009* (2013.01); *B01D 2259/40096* (2013.01); *B01D 2259/4566* (2013.01)

(58) Field of Classification Search
CPC ....... B01D 53/0438; B01D 53/0446; B01D 53/04; B01D 2253/102; B01D 2257/90; B01D 2259/06; B01D 2259/4009; B01D 2259/40096; B01D 2259/4566; B60H 1/2225; B60H 3/0633; B60H 2003/0691
USPC .......... 55/585.4; 422/120; 96/108, 144, 146; 95/148; 123/198 F
See application file for complete search history.

(56) References Cited

U.S. PATENT DOCUMENTS

| | | | | |
|---|---|---|---|---|
| 5,938,523 | A * | 8/1999 | Khelifa | B60H 3/0633 454/156 |
| 2004/0149129 | A1* | 8/2004 | Petersson | B60H 3/0633 95/148 |
| 2007/0089605 | A1* | 4/2007 | Lampinen | B01D 53/0431 95/139 |
| 2013/0059521 | A1* | 3/2013 | Loup | B60H 3/0633 454/158 |
| 2017/0050497 | A1* | 2/2017 | Sawyer | B01J 20/3416 |
| 2018/0222290 | A1* | 8/2018 | Anderson | B01D 46/4263 |
| 2019/0160418 | A1* | 5/2019 | Matsumoto | B01D 53/0438 |

* cited by examiner

*Primary Examiner* — Frank M Lawrence, Jr.
(74) *Attorney, Agent, or Firm* — Vivacqua Crane PLLC

(57) ABSTRACT

An HVAC system for a motor vehicle includes a filter that absorbs odors and gases in a cabin of the motor vehicle and desorbs the odors and gases when heated, and a heater that is turned on to heat the filter during cool ambient conditions. The heater is turned off during warm ambient conditions and warm ambient air is utilized to heat the filter. The desorbed odors and gases are purged from the cabin of the motor vehicle.

20 Claims, 7 Drawing Sheets

|  |  | Condition 1 | Condition 2 |
|---|---|---|---|
| Cool Ambient | Function | Desorb | Purge/Condition |
|  | Air Inlet Door | Recirc Air | Fresh Air |
|  | Heater | On | On |
|  | A/C | Off | On/Off |
| Warm Ambient | Function | Desorb/Purge | Condition |
|  | Air Inlet Door | Fresh Air | Recirc Air |
|  | Heater | Off | Off |
|  | A/C | On/Off | On |

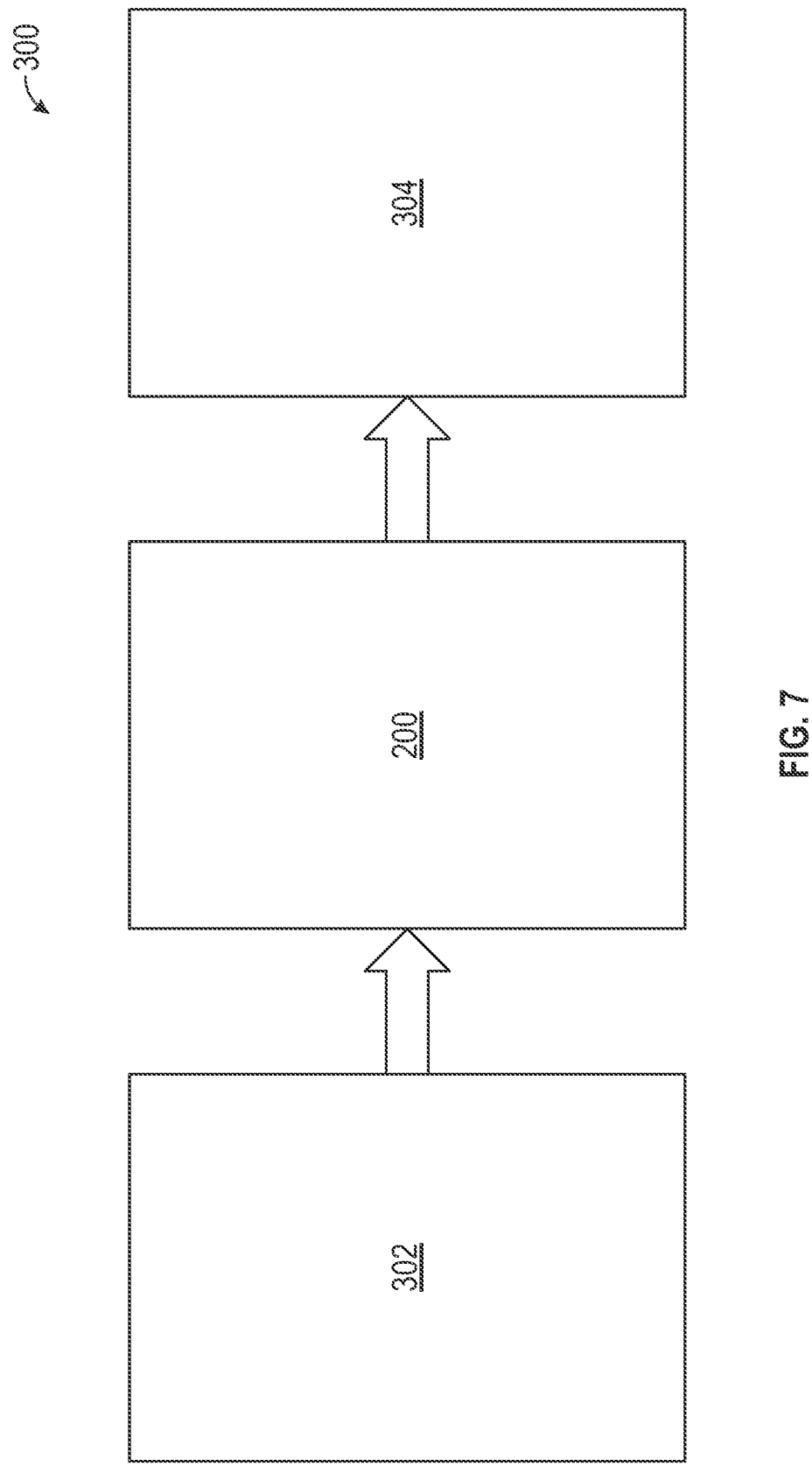

OPERATION OF A HVAC SYSTEM TO DESORB A FILTER

INTRODUCTION

The present disclosure relates to an HVAC system for a motor vehicle. More specifically, the present disclosure relates to an HVAC system that includes a desorption process.

A typical motor vehicle includes an HVAC system to condition the air in the cabin of the motor vehicle. Specifically, an activated charcoal a filter is utilized to absorb odors, gases, and chemicals from the cabin air. Over time, however, the filters become saturated and, therefore, become unable to absorb additional odors, gases, and chemicals from the cabin air. Accordingly, the filter must then be replaced with a new filter. The filter is also able to absorb and desorb moisture, which, however, in a typical HVAC application is an uncontrolled process.

Thus, while current vehicle HVAC systems achieve their intended purpose, there is a need for a new and improved HVAC system to have greater capacity remove odors, gases, chemicals and moisture from the cabin air of motor vehicles for greater efficiency in the operation of the vehicle while improving comfort for occupants of the vehicle.

SUMMARY

According to several aspects, an HVAC system for a motor vehicle includes a filter that absorbs odors and gases in a cabin of the motor vehicle and desorbs the odors and gases when heated, and a heater that is turned on to heat the filter during cool ambient conditions. The heater is turned off during warm ambient conditions and warm ambient air is utilized to heat the filter. The desorbed odors and gases are purged from the cabin of the motor vehicle.

In an additional aspect of the present disclosure, the odors and gases are desorbed from the filter and then purged from the cabin of the motor vehicle during cool ambient conditions.

In another aspect of the present disclosure, warm cabin air is recirculated to heat the filter to desorb the odors and gases from the filter.

In another aspect of the present disclosure, fresh air is introduced into the cabin to purge the odors and gases from the cabin of the motor vehicle.

In another aspect of the present disclosure, the odors and gases are desorbed from the filter and simultaneously purged from the cabin of the motor vehicle during warm ambient conditions.

In another aspect of the present disclosure, warm ambient air is introduced into the cabin to heat the filter to desorb the odors and gases from the filter while the desorbed odors and gases are being purged from the cabin.

In another aspect of the present disclosure, air in the cabin is recirculated to condition the air.

In another aspect of the present disclosure, an air conditioning unit is activated during the conditioning of the cabin air.

In another aspect of the present disclosure, the HVAC system further includes a duct that directs heated air from the heater directly to the filter to desorb odors and gases from the filter.

In another aspect of the present disclosure, the HVAC system further incudes a blower that reverses air flow through the HVAC system.

In another aspect of the present disclosure, the filter is heated as the reverse air flow flows through the filter and exits a fresh air intake.

In another aspect of the present disclosure, the reversed air flow is heated by the heater.

According to several aspects, an HVAC system for a motor vehicle includes a filter that absorbs odors and gases in a cabin of the motor vehicle and desorbs the odors and gases when heated, and a heater that is turned on to heat the filter during cool ambient conditions and is turned off during warm ambient conditions and warm ambient air is utilized to heat the filter. The odors and gases are desorbed from the filter and then purged from the cabin of the motor vehicle during cool ambient conditions and are desorbed from the filter and simultaneously purged from the cabin of the motor vehicle during warm ambient conditions.

In another aspect of the present disclosure, the HVAC system further includes a duct that directs heated air from the heater directly to the filter to desorb odors and gases from the filter.

In another aspect of the present disclosure, the HVAC system further includes a blower that reverses air flow through the HVAC system.

In another aspect of the present disclosure, the filter is heated as the reverse air flow flows through the filter and exits a fresh air intake.

In another aspect of the present disclosure, warm cabin air is recirculated to heat the filter to desorb the odors and gases from the filter during cool ambient conditions, and fresh air is introduced into the cabin to purge the odors and gases from the cabin of the motor vehicle during cool ambient conditions.

In another aspect of the present disclosure, warm ambient air is introduced into the cabin to heat the filter to desorb the odors and gases from the filter while the desorbed odors and gases are being purged from the cabin during warm ambient conditions, and air in the cabin is recirculated to condition the air in the cabin during warm ambient conditions.

According to several aspects, a motor vehicle includes an HVAC system with a filter that absorbs odors and gases in a cabin of the motor vehicle and desorbs the odors and gases when heated, a heater that is turned on to heat the filter during cool ambient conditions and is turned off during warm ambient conditions and warm ambient air is utilized to heat the filter, and a duct that directs heated air from the heater directly to the filter to desorb odors and gases from the filter during cool ambient conditions. The odors and gases are desorbed from the filter and then purged from the cabin of the motor vehicle during cool ambient conditions and are desorbed from the filter and simultaneously purged from the cabin of the motor vehicle during warm ambient conditions.

In another aspect of the present disclosure, the HVAC system further includes a blower that reverses air flow through the HVAC system, the filer being heated as the reverse air flows through the filter and exits a fresh air intake.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7 is a flow diagram of an overall process implementing the process shown in FIG. 6.

DETAILED DESCRIPTION

The following description is merely exemplary in nature and is not intended to limit the present disclosure, application, or uses.

Referring to FIGS. 1A through 1D, there is shown a heating, ventilation and air conditioning (HVAC) system 10 (FIG. 4A) implemented in a motor vehicle 11, specifically an electric vehicle. The electric vehicle 11 includes a battery that is periodically charged by connecting a plug 16 to an electrical outlet.

The HVAC system 10 includes an absorbent filter, such as, for example, an activated charcoal filter 48 that absorbs odors, chemicals, gases and excess moisture from the cabin of the motor vehicle 11 to condition the cabin air to a comfort level desired by the occupants of the cabin. When the activated charcoal filter 48 is heated, the filter 48 desorbs odors, chemicals, gases and excess moisture from the filter 48. In some arrangements, the heating of the activated charcoal filter 48 occurs as the battery in the vehicle 11 is being charged.

Figures 2, 3:
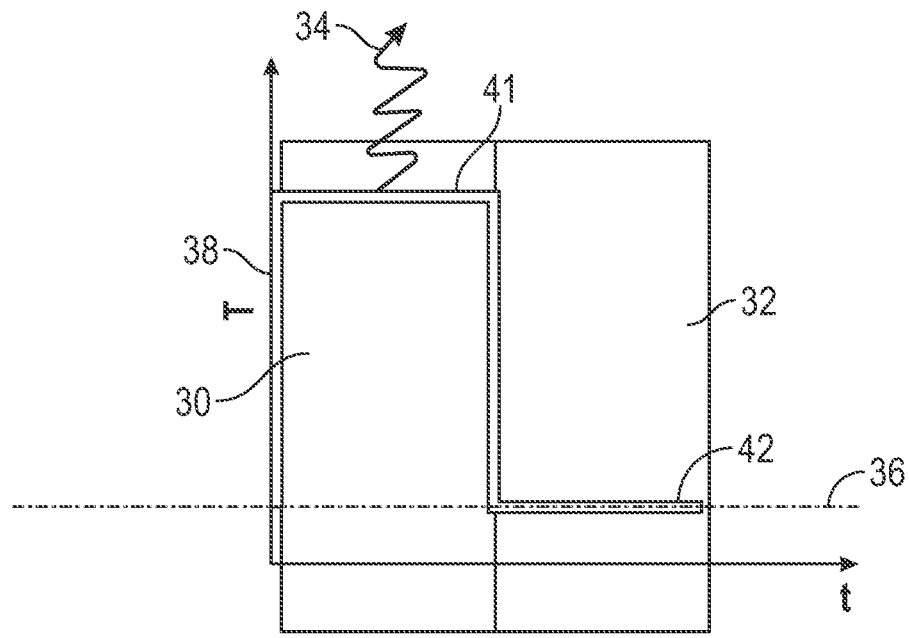
FIG. 2 is a graph of temperature vs. time during desorption and absorption cycles of the filter according to an exemplary embodiment.
FIG. 3 is a chart of the desorption an absorption cycles for cool ambient conditions and warm ambient conditions according to an exemplary embodiment.

Referring also to FIG. 2, there is shown a time (t) vs. temperature (T) profile for the activated charcoal filter 48 as it absorbs and desorbs odors, chemicals, gases and excess moisture. Specifically, as the temperature profile 38 increases above a specified system operation temperature 36, the desorption 34 of the filter 48 occurs, as indicated by a region 30 of the t vs. T profile. After the temperature peaks 41, the temperature reduces to a minimum approximately corresponding to the system operation temperature 36 such that the filter 48 absorbs odors, chemicals, gases and excess moisture from the cabin of the vehicle 11, as indicated by the region 32 of the t vs. T profile.

Figure 4A:
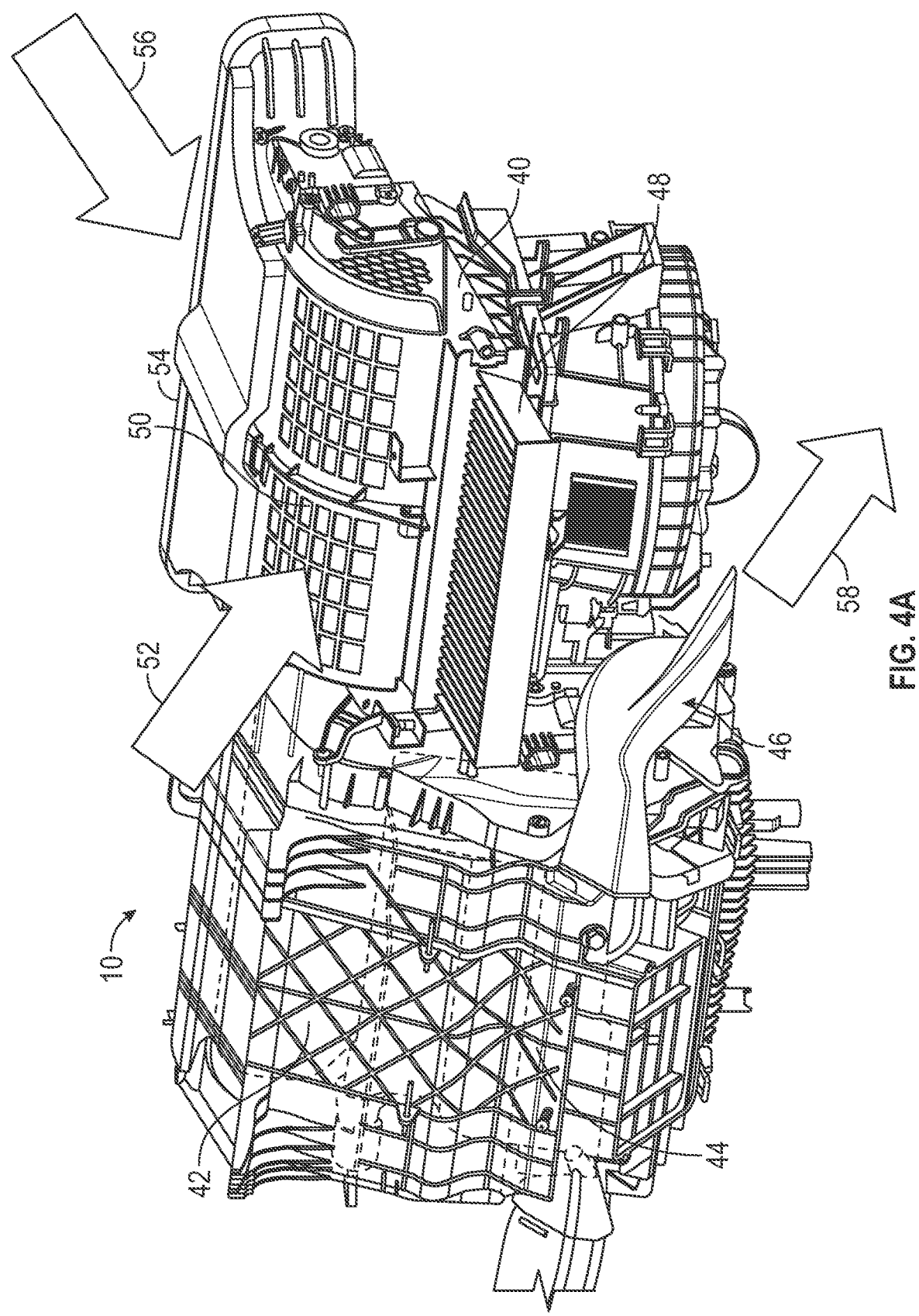
FIG. 4A is a perspective view of the HVAC system according to an exemplary embodiment.

Referring back to FIG. 1A and to FIG. 3, when the ambient temperature is cool, as indicated by the snowflake upper left portion of the drawing (condition 1), the heater 44 (FIG. 4A) is turned on and the air inlet door is closed so that the cabin air is recirculated, as indicated by the arrow 12 and introduced to the HVAC system 10, as indicated by the arrow 52 in FIG. 4A. The warm recirculated air heats the activated charcoal filter 48 so that desorption of the filter 48 occurs. Typically, the air conditioning unit (A/C) is turned off in condition 1.

Figure 1A:
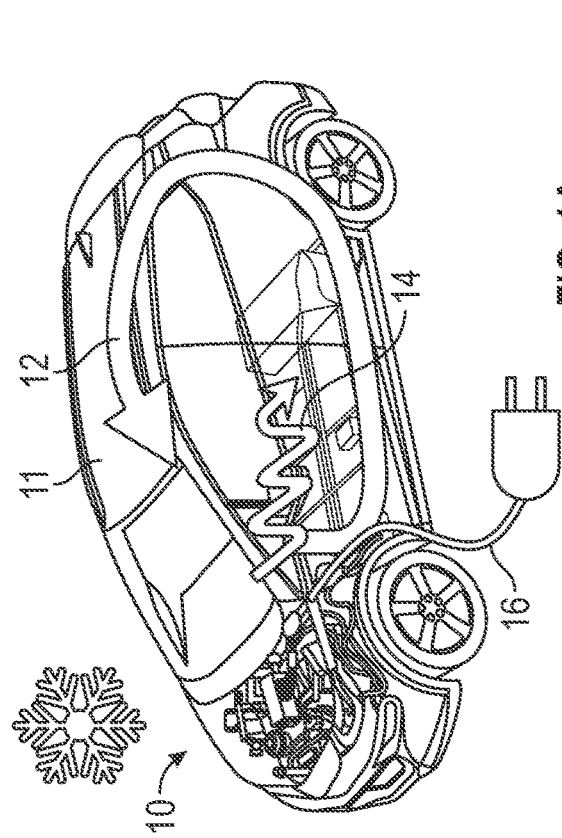
FIG. 1A is a perspective view of a motor vehicle with an HVAC system during desorption of a filter in cool ambient conditions according to an exemplary embodiment.
Figure 1B:
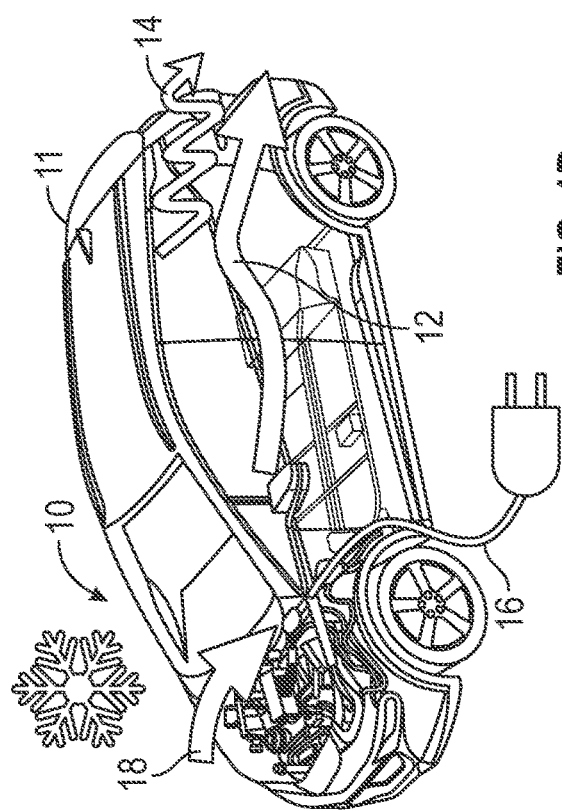
FIG. 1B is a perspective view of the motor vehicle with the HVAC system during purging of the filter and conditioning of a cabin of the motor vehicle in cool ambient conditions according to an exemplary embodiment.

FIG. 1B corresponds to condition 2 in FIG. 3 under cool ambient conditions in which an air inlet door 54 (FIG. 4A) is open to let in fresh air 18 and as indicated by the arrow 56 in FIG. 4A. The odors, chemicals, gases and excess moisture desorbed from the filter 48 are purged from the vehicle 11, as indicated by the arrow 14. Also the heated air from the HVAC system 10 is pushed through the vehicle 11, indicated by the arrow 12, as fresh air 18 is brought into the cabin of the vehicle 11 condition the cabin air. The A/C unit may be turned on to further condition the cabin air.

Figure 1C:
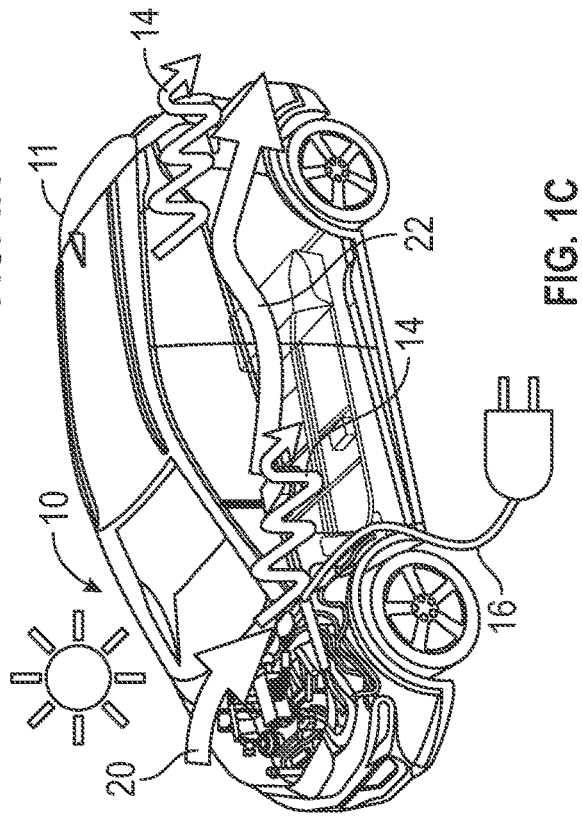
FIG. 1C is a perspective view of the motor vehicle with the HVAC system during desorption and purging of the filter in warm ambient conditions according to an exemplary embodiment.
Figure 1D:
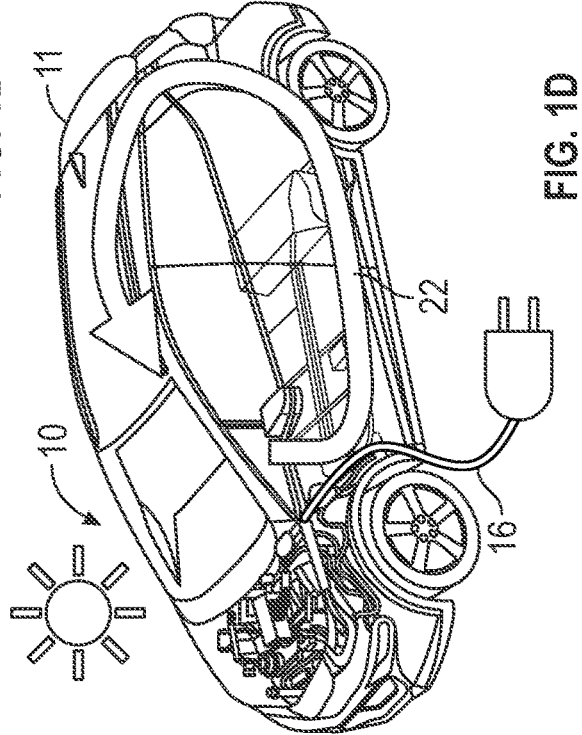
FIG. 1D is a perspective view of the motor vehicle with the HVAC system during conditioning of the cabin of the motor vehicle in warm ambient conditions according to an exemplary embodiment.

FIGS. 1C and 1D correspond to the warm ambient conditions in FIG. 3 and as indicated by the image of the sun in the upper left corner of the drawings. Specifically, FIG. 1 corresponds to a desorb/purge function in condition 1, in which the heater 44 is turned off and the air inlet door 54 is opened to let in fresh air 20 and as indicated by the arrow 56 in FIG. 4A. In condition 1, the fresh warm air 20 is brought in to heat the activated charcoal filter 48 such that it desorbs odors, gases, chemicals and excess moisture, as indicated by the arrow 14. The desorbed odors, gases, chemicals and moisture are purged from the cabin, as indicated by the arrow 14 at the rear of the vehicle 11, when the cabin air is pushed out, as indicated by the arrow 22 while fresh air 20 is introduced to the cabin. The A/C unit may be turned on if desired.

Turning now to FIG. 1D, which corresponds to condition 2 in FIG. 3, the air inlet door 54 (FIG. 4A) is closed to recirculate the cabin air, as indicated by the arrow 22 and introduced to the HVAC system 10, as indicated by the arrow 52 in FIG. 4A, while the heater 44 is remains off. The A/C unit is typically turned on to further condition the cabin air.

Referring specifically now to FIG. 4A, the HVAC system 10 includes a housing 40 in which the heater 44 as well as an evaporator 42 are disposed. The heater 44 is turned on to heat the air. The evaporator 42 is activated when the A/C is turned. Air is brought into the HVAC system 10 and pushed through the system 10 with a blower situated in the housing 40. The activated charcoal filter 48 is shown partially removed from the housing 40 for illustration purposes. When the HVAC system 10 is in operation the activated charcoal filter 48 is fully inserted into the housing 40. The recirculated air 52 is introduced to the HVAC system 10 through a set of grids 50, while fresh air 56 is introduced to the HVAC system 10 through the air inlet door 54. Further, cool or warm air 56 is directed to the floor of the cabin, as indicated by the arrow 58.

Figure 4B:
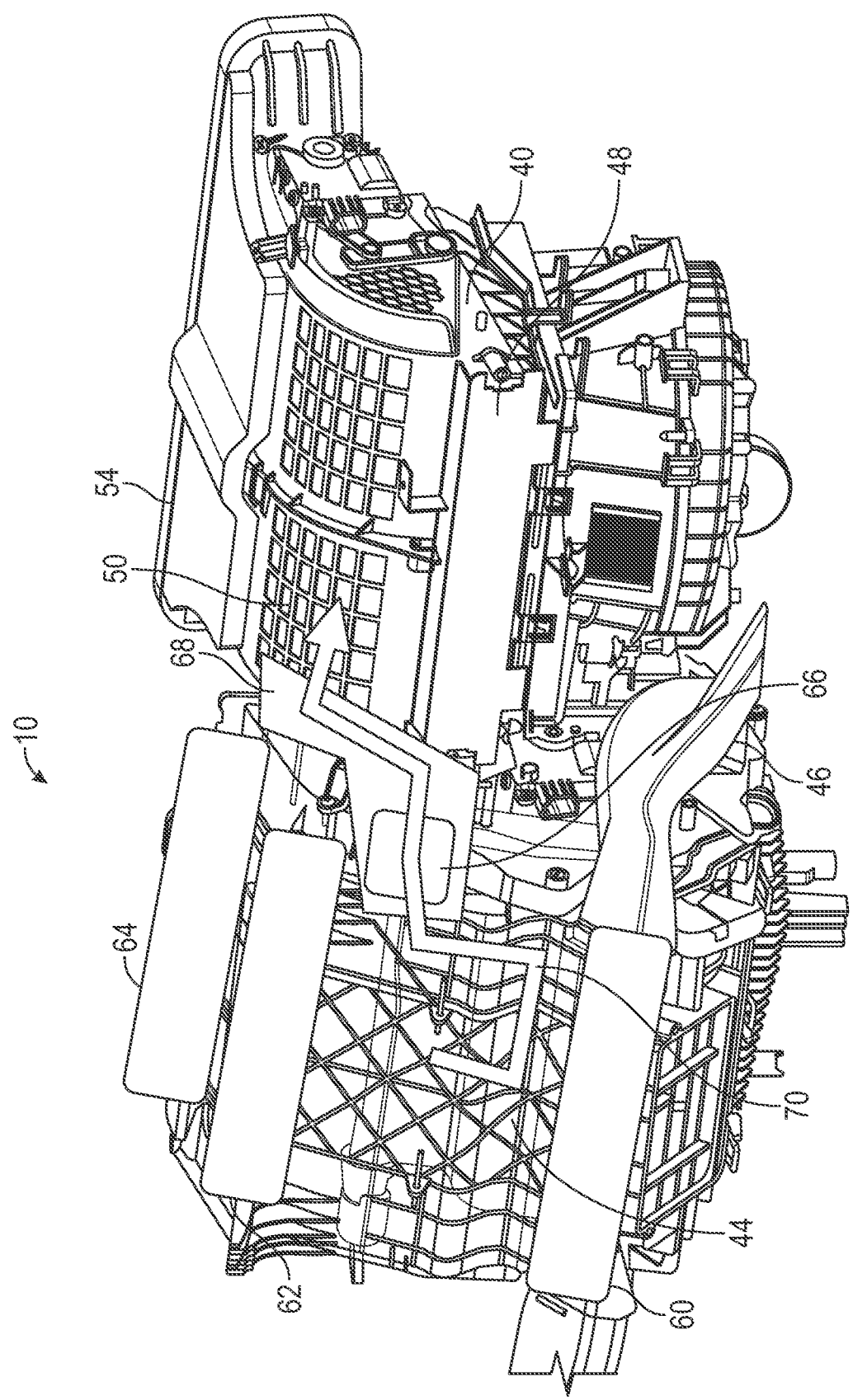
FIG. 4B is a perspective view of an alternative HVAC system according to an exemplary embodiment.

Referring now to FIG. 4B, there is shown another arrangement for the HVAC system 10, in which actuators are operated to close a door 64 to the defroster outlet, close a door 62 to the dashboard vents, and close a door 60 to floor duct 66. A door 66 within the housing 40 is opened to enable heated air 70 to flow directly from the heater 44 to duct work 68. The duct work 68 leads to the recirculation portion of the HVAC system. As such, the warm heated air from the heater 44 does not have to recirculate through the cabin as shown in FIG. 1A before heating the activated charcoal filter 48. Rather, the arrangement shown in FIG. 4B minimizes temperature losses of the heated air by directly sending the heated air to the activated charcoal filter 48 to heat the filter 48 during the desorption of the filter.

Figure 5A:
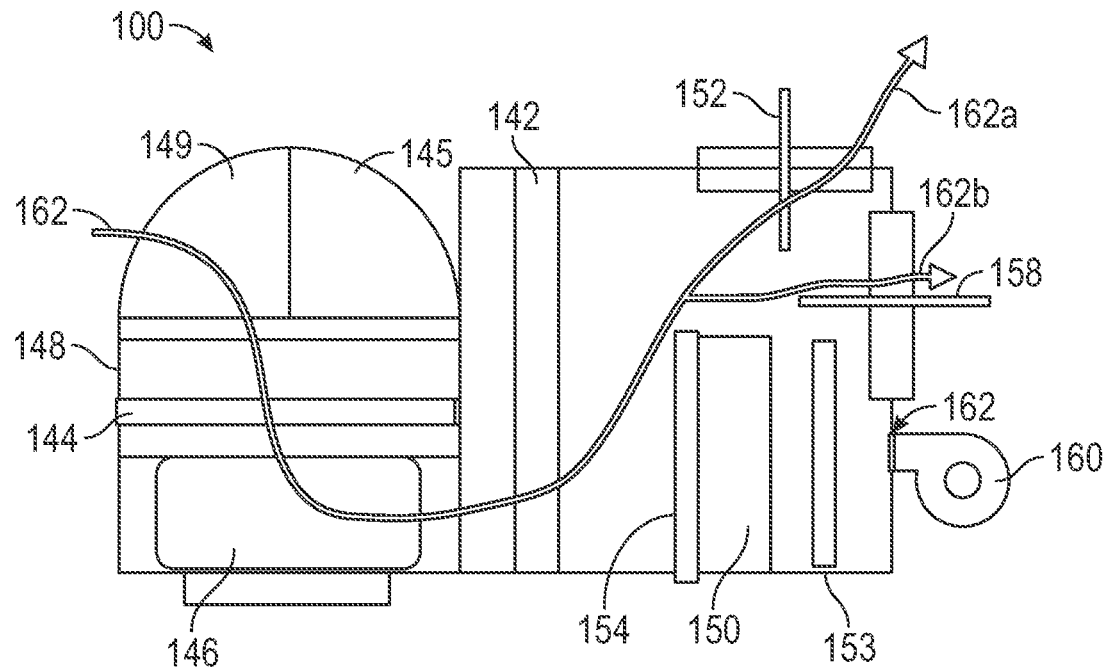
FIG. 5A is a schematic view of an alternative HVAC system with a secondary blower as fresh air is brought into the HVAC system.
Figure 5B:
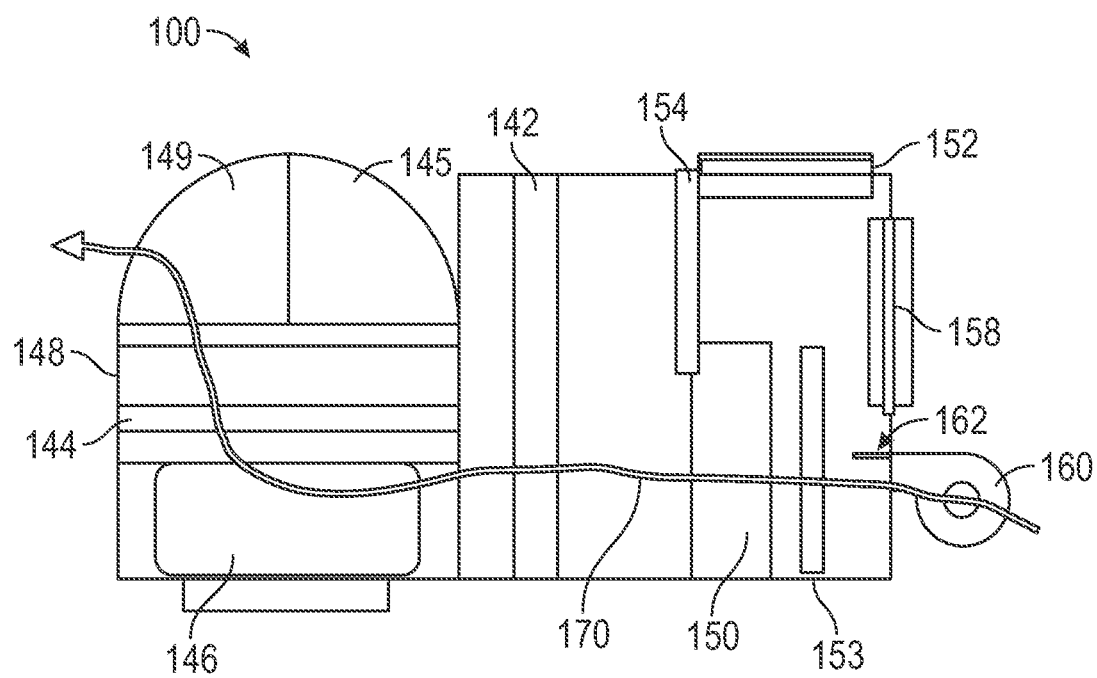
FIG. 5B is a schematic view of an alternative HVAC system with the secondary blower as the airflow is reversed and expelled through the intake of the HVAC system according to an exemplary embodiment.

Turning now to FIG. 5A, there is shown a modification of the HVAC system 10 as an HVAC system 100. The HVAC system 100 includes a secondary blower 160 in addition to a primary blower 146. During regular operation of the HVAC system 100, the primary blower 146 is turned on to draw fresh air 162 into the HVAC system 100 through an intake 149. (Alternatively, recirculated air can enter the HVAC system 100 through a recirculation door 145.) The air 162 flows through an evaporator 142, which is on when the A/C is on. Outlet doors 152 and 158 are open to allow the flow of air to exit the HVAC system, as indicated by the arrows 162a and 162b. Under these operating conditions, the secondary blower 160 is off and a door 154 keeps heat from a heater core 150. A secondary positive temperature coefficient (PTC) heater 153 is also typically turned off.

When the HVAC system 100 is operated in a desorption mode, the primary blower 146 is turned off, the secondary blower 160 is turned on, and a recirculation door is set to open the intake 149. The outlet doors 152 and 158 are closed and a door 162 is opened to allow air 170 drawn from the cabin by the secondary blower 150 to enter the HVAC system 100. The door 154 is opened to allow the incoming air to be heated by the heater core 150. The secondary PTC heater 153 may also be turned on to provide further heating of the incoming air 170. The air 170, now heated by the heater core 150 and optionally by the secondary PTC heater 153, flows through the evaporator 142 and subsequently through the filter 148. The heater 144 may also be turned on to further heat the filter 148. As such, the filter 148 is heated to desorb odors, gases, chemicals and excess moisture that is removed from the HVAC system through the intake 149.

Figure 6:
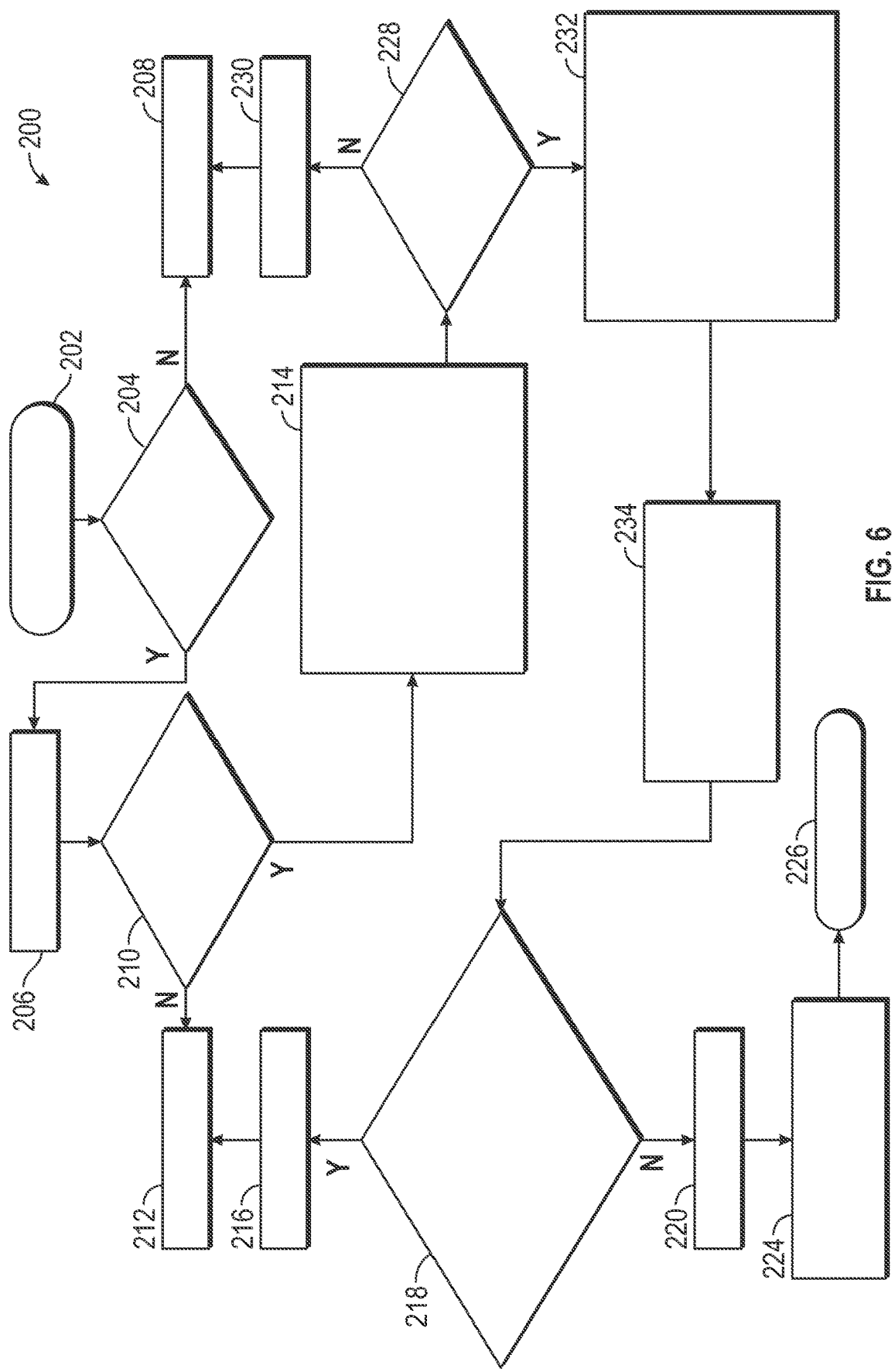
FIG. 6 is a flow diagram of a process for utilizing the HVAC system shown in FIGS. 5A and 5B.

Turning now to FIG. 6, there is shown a process 200 for the operation of the HVAC system 100. At step 202, the vehicle 11 is turned off and the process 200 begins. A decision step 204 decides if run-times meet minimum requirements. If the decision is no, the process aborts in step 208. If the decision is yes, there is a delay in step 206 and a decision step 210 decides if the battery state of charge is above a specified requirement. If the decision is no, the process 200 aborts in step 212. If the decision is yes, the process 200 moves a HVAC mode cam to a desorbing positions, moves the temperature door 154 to a full hot position, moves the recirculation door to a fresh air position, and turns on the secondary blower 160. In step 228, a decision is made to determine if the secondary blower diagnostic passes. If the decision is no, then the process 200 sets the relevant diagnostic trouble code (DTC) in step 230 and aborts in step 208. If the decision is yes, the process moves to step 232 where the coolant pump is run and any valves are set to allow the heater core 150 operate, the optional PTC heater 153 is turned on, and the optional desorption heater 144 is turned on. In step 234, the PTC heater 153 and the desorption heater 144 self-regulate to monitor temperatures of the heaters. A decision step 218 determines if any sensed parameters are out of bound and if the temperature reading of the evaporator 142 to high or too low. If the decision is yes, step 216 sets the relevant DTC and the process 200 aborts in step 212. If the decision is no, the desired run-time of the HVAC system 100 occurs in step 220, and all components are turned off in step 224. The process 200 ends in step 226.

Turning to FIG. 7, there is shown an overall process 300 with inputs 302 and outputs 304 implementing the process 200. The inputs 302 includes outside air temperature, evaporator air temperature, A/C run time, HVAC run-time, relevant DTCs from other controllers, and the state of charge of the battery. The outputs 304 include blower speed of the secondary blower 160, the mode cam position, the air inlet position, the PTC heater 153 power, the coolant pump speed, the coolant valve position and the desorption heater power. The HVAC routine control logic process 200 detects DTCs for actuators, sensors and blower motors; drying routine for the evaporator 142; the desorption routine for the filter 148; and the calibration of the timers for the run time and delay to run time.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An HVAC system for a motor vehicle, the system comprising:
    a filter configured to absorb odors and gases in a cabin of the motor vehicle and desorb the odors and gases when heated; and
    a heater configured to be turned on to heat the filter during cool ambient conditions,
    wherein the heater configured to be turned off during warm ambient conditions such that warm ambient air is utilized to heat the filter, and
    wherein the desorbed odors and gases are purged from the cabin of the motor vehicle.

2. The HVAC system of claim 1, wherein the odors and gases are desorbed from the filter and then purged from the cabin of the motor vehicle during cool ambient conditions.

3. The HVAC system of claim 2, wherein warm cabin air is recirculated to heat the filter to desorb the odors and gases from the filter.

4. The HVAC system of claim 3, wherein fresh air is introduced into the cabin to purge the odors and gases from the cabin of the motor vehicle.

5. The HVAC system of claim 1, wherein the odors and gases are desorbed from the filter and simultaneously purged from the cabin of the motor vehicle during warm ambient conditions.

6. The HVAC system of claim 5, wherein warm ambient air is introduced into the cabin to heat the filter to desorb the odors and gases from the filter while the desorbed odors and gases are being purged from the cabin.

7. The HVAC system of claim 5, wherein air is recirculated in the cabin to condition the air.

8. The HVAC system of claim 7, wherein an air conditioning unit is configured to activate during the conditioning of the cabin air.

9. The HVAC system of claim 1 further comprising a duct configured to direct heated air from the heater directly to the filter to desorb odors and gases from the filter.

10. The HVAC system of claim 1 further comprising a blower configured to reverse air flow through the HVAC system.

11. The HVAC system of claim 10, wherein the filter is configured to be heated as the reverse air flow flows through the filter and exits a fresh air intake.

12. The HVAC system of claim 11, wherein the reversed air flow is heated by the heater.

13. An HVAC system for a motor vehicle, the system comprising:
a filter configured to absorb odors and gases in a cabin of the motor vehicle and desorbs the odors and gases when heated; and
a heater configured to be turned on to heat the filter during cool ambient conditions and is configured to be turned off during warm ambient conditions such that warm ambient air is utilized to heat the filter,
wherein the odors and gases are desorbed from the filter and then purged from the cabin of the motor vehicle during cool ambient conditions,
wherein the odors and gases are desorbed from the filter and simultaneously purged from the cabin of the motor vehicle during warm ambient conditions.

14. The HVAC system of claim 13 further comprising a duct configured to direct heated air from the heater directly to the filter to desorb odors and gases from the filter.

15. The HVAC system of claim 13 further comprising a blower configured to reverse air flow through the HVAC system.

16. The HVAC system of claim 15, wherein the filter is configured to be heated as the reverse air flow flows through the filter and exits a fresh air intake.

17. The HVAC system of claim 13, wherein warm cabin air is recirculated to heat the filter to desorb the odors and gases from the filter during cool ambient conditions, and wherein fresh air is introduced into the cabin to purge the odors and gases from the cabin of the motor vehicle during cool ambient conditions.

18. The HVAC system of claim 13, wherein warm ambient air is introduced into the cabin to heat the filter to desorb the odors and gases from the filter while the desorbed odors and gases are being purged from the cabin during warm ambient conditions, and wherein in the cabin air recirculated to condition the air in the cabin during warm ambient conditions.

19. A motor vehicle comprising:
an HVAC system, the HVAC system including:
a filter configured to absorb odors and gases in a cabin of the motor vehicle and desorbs the odors and gases when heated;
a heater configured to be turned on to heat the filter during cool ambient conditions and is configured to be turned off during warm ambient conditions such that warm ambient air is utilized to heat the filter; and
a duct that directs configured to direct heated air from the heater directly to the filter to desorb odors and gases from the filter during cool ambient conditions,
wherein the odors and gases are desorbed from the filter and then purged from the cabin of the motor vehicle during cool ambient conditions,
wherein the odors and gases are desorbed from the filter and simultaneously purged from the cabin of the motor vehicle during warm ambient conditions.

20. The motor vehicle of claim 19, wherein the HVAC system further includes a blower configured to reverse air flow through the HVAC system, the filter configured to be heated as the reverse air flows through the filter and exits a fresh air intake.

* * * * *